(12) United States Patent
Kirts

(10) Patent No.: US 8,021,549 B2
(45) Date of Patent: Sep. 20, 2011

(54) METHOD AND APPARATUS FOR PRODUCING POTABLE WATER FROM SEAWATER USING FORWARD OSMOSIS

(75) Inventor: Richard Eugene Kirts, Oxnard, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1022 days.

(21) Appl. No.: 11/865,897

(22) Filed: Oct. 2, 2007

(65) Prior Publication Data

US 2009/0308727 A1    Dec. 17, 2009

(51) Int. Cl.
*B01D 61/00* (2006.01)
*B01D 61/58* (2006.01)

(52) U.S. Cl. ............. 210/257.2; 210/321.6; 210/321.66; 210/192; 210/202; 210/649; 210/651; 210/652

(58) Field of Classification Search .................. None
See application file for complete search history.

(56) References Cited

U.S. PATENT DOCUMENTS

| | | | | |
|---|---|---|---|---|
| 3,130,156 | A * | 4/1964 | Neff | 210/177 |
| 3,617,547 | A * | 11/1971 | Halff et al. | 210/638 |
| 3,929,600 | A * | 12/1975 | Hiasa et al. | 210/668 |
| 2005/0145568 | A1* | 7/2005 | McGinnis | 210/639 |
| 2006/0144789 | A1* | 7/2006 | Cath et al. | 210/641 |

* cited by examiner

*Primary Examiner* — Krishnan S Menon
(74) *Attorney, Agent, or Firm* — Christopher L. Blackburn; David S. Kalmbaugh

(57) ABSTRACT

A method and apparatus for desalinating seawater which uses an ammonia bicarbonate forward osmosis desalination process. Seawater is pumped through one side of a membrane assembly. A draw solution is pumped through the other side of the membrane assembly. The draw solution withdraws water molecules from the seawater through the membrane into the draw solution. A draw solution separator receives a heated draw solution which then decomposes into ammonia, carbon dioxide and water. Potable water is separated from ammonia has and carbon dioxide gas. The ammonia gas and carbon dioxide gas are recombined with a portion of the potable water stream to reform the ammonium bicarbonate draw solution.

7 Claims, 2 Drawing Sheets

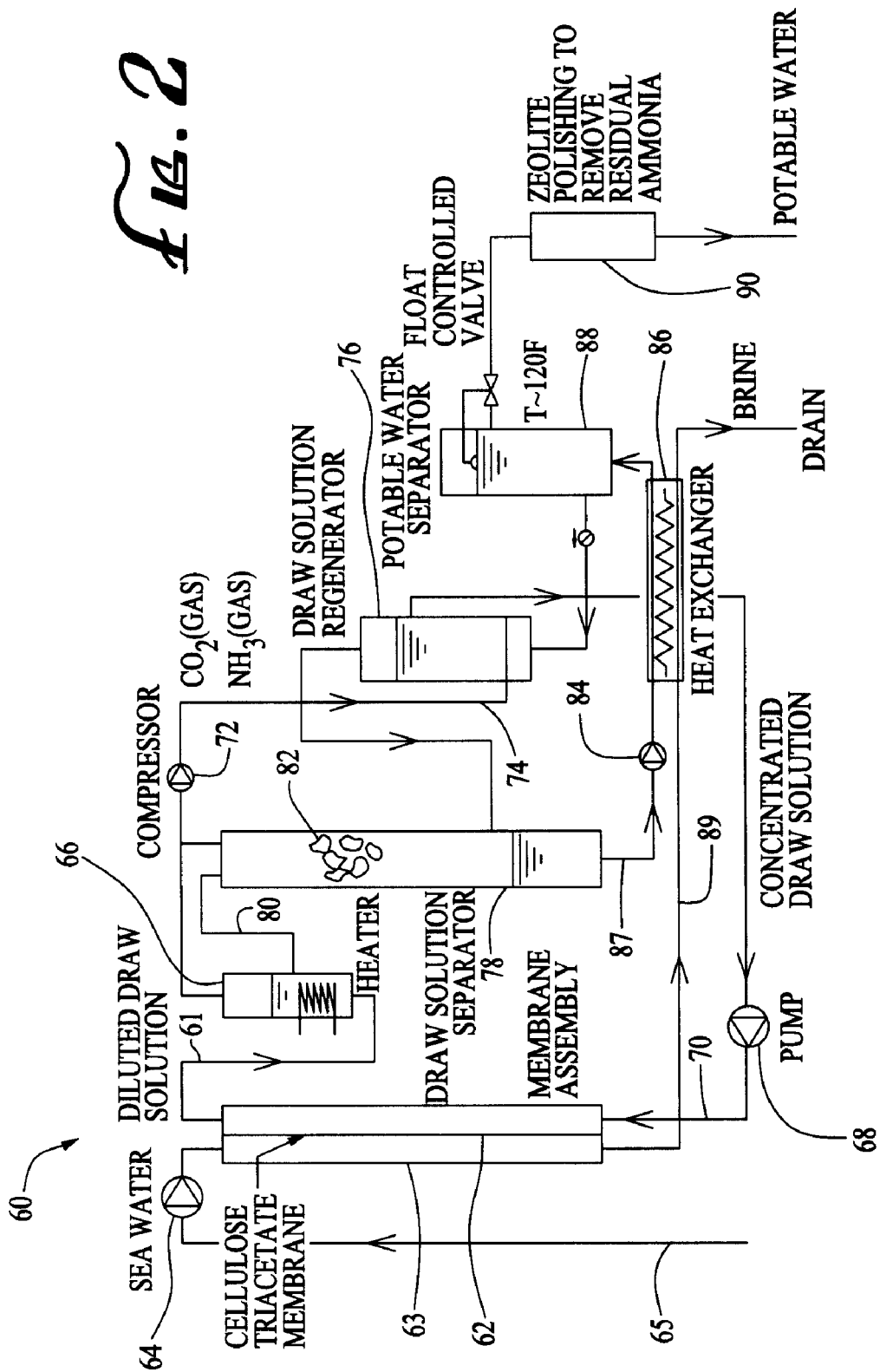

METHOD AND APPARATUS FOR PRODUCING POTABLE WATER FROM SEAWATER USING FORWARD OSMOSIS

BACKGROUND OF THE INVENTION

1. Field of the Invention

The present invention relates generally to a method for recovery water which is safe for drinking from seawater. More particularly, the present invention relates to a method which uses an ammonia bicarbonate draw solution in a forward osmosis process to desalinate seawater to provide safe drinking water.

2. Description of the Prior Art

Safe drinking water is a vital commodity in military operations that must be supplied to troops on a continuing basis. Potable water carried by a typical soldier or Marine in a combat environment accounts for about forty percent by weight of the consumable material which the soldier or Marine must carry.

Potable water for military operations is often made in large quantity from local supplies of fresh, brackish or salt water using the reverse osmosis (RO) process.

The military has used RO technology for years for water purification with great success. However, reverse osmosis technology is significantly more complex than conventional municipal processes for producing potable water. In addition, RO is often more energy intensive than conventional municipal processes. Reverse osmosis requires pressurizing seawater to a very high pressure, (typically 900 to 1000 pounds per square inch) for operation. For large commercial reverse osmosis installations, the energy consumption of the process can be reduced by installing devices that recover a significant of the energy expended to pressurize the seawater. For military operations, however, the complexity, weight, and maintenance requirement of these energy recovery devices usually precludes their use.

Forward osmosis is a process used to desalinate seawater and produce potable water from non-potable sources including saltwater. This process produces potable water through a semi-permeable membrane, such as a membrane assembly, that allows the passage of water but blocks the passage of salts. In forward osmosis, the driving force that drives water across the membrane is the difference in osmotic pressure across the membrane. Forward osmosis draws the water molecules through the membrane using a difference in osmotic pressure.

For forward osmosis, seawater is on one side of the membrane and a draw solution is on the other side of the membrane. The draw solution has an osmotic pressure that is significantly higher than that of seawater. This allows the draw solution to draw water molecules from the seawater through the membrane in an effort to equalize the osmotic pressure on both sides of the membrane.

For forward osmosis to be effective in drawing water molecules from seawater, the draw solution must have an osmotic pressure greater than that of seawater. When seawater is approximately 3.5% NaCl, the molarity of sodium chloride is equal to 0.60 moles/liter. In accordance with Van't Hoff's equation, the osmotic pressure is:

$$\Pi = I * C * R * T$$

where
$\Pi$=osmotic pressure
I=Van't Hoff's factor
C=molar concentration, moles/liter
R=universal gas constant=0.08206 Liter*atm/mole/° K
T=° K Then the osmotic pressure for seawater is:

$$\Pi_{seawater} = 1.8 * 0.60 * 0.08206 * 26.4 = 26.4 \text{ atm}$$

Many draw solutions can be identified which would function in the present invention. However, there is a need to identify a non-toxic compound that is easily separated from the draw solution so that only potable water remains. The ideal draw solution consist of a chemical compound or a nanometer size particle that is easily removed from a diluted draw solution and reused. Draw solutions may include magnetic proteins (magnetoferritin) particles, liquids that can easily be separated from water by low temperature distillation, and compounds that sublime to gases.

A chemical compound that sublimes to gases is ammonium bicarbonate ($NH_4HCO_3$). Ammonium bicarbonate is a non-toxic, low cost, industrial chemical used as a rising agent in commercial bakeries. It is also used as a fertilizer. The most useful characteristic of ammonium bicarbonate for the present invention is that it decomposes into ammonia gas, carbon dioxide, and water vapor at temperatures above 150° F. This property of ammonium bicarbonate makes it a very desirable candidate for use as a draw solution in the present invention.

SUMMARY OF THE INVENTION

The present invention overcomes some of the difficulties of other water desalination technologies (including those mentioned above) in that it is an efficient and effective method and apparatus for desalinating seawater which uses ammonia and carbon dioxide compounds in a forward osmosis (FO) desalination process.

A low pressure pump continuously pumps seawater past one side of a semi-permeable membrane assembly. A second pump pumps a concentrated draw solution of ammonium bicarbonate dessolved in water past the opposite side of the membrane assembly. The high osmotic pressure of the draw solution pulls water molecules from the seawater through the membrane and into the draw solution.

The draw solution exits the membrane assembly at a lower osmotic pressure because it is diluted with water molecules drawn from the seawater. A heater heats the diluted draw solution to a temperature of about 150° F., which is greater than the decomposition temperature of a draw solution of ammonium bicarbonate. Above 150° F., the ammonium bicarbonate decomposes into ammonia, carbon dioxide, and water. Excess water, which consist of the water molecules removed from the seawater, is removed from the system as potable water.

The remaining water is recombined with the ammonia and carbon dioxide gases to form a concentrated aqueous solution of ammonium bicarbonate which is again pumped through the membrane assembly, thereby repeating the cycle.

BRIEF DESCRIPTION OF THE DRAWINGS

FIG. 2 is a detailed schematic diagram the forward osmosis water purification process and system of FIG. 1.

DETAILED DESCRIPTION OF A PREFERRED EMBODIMENT

Figure 1:
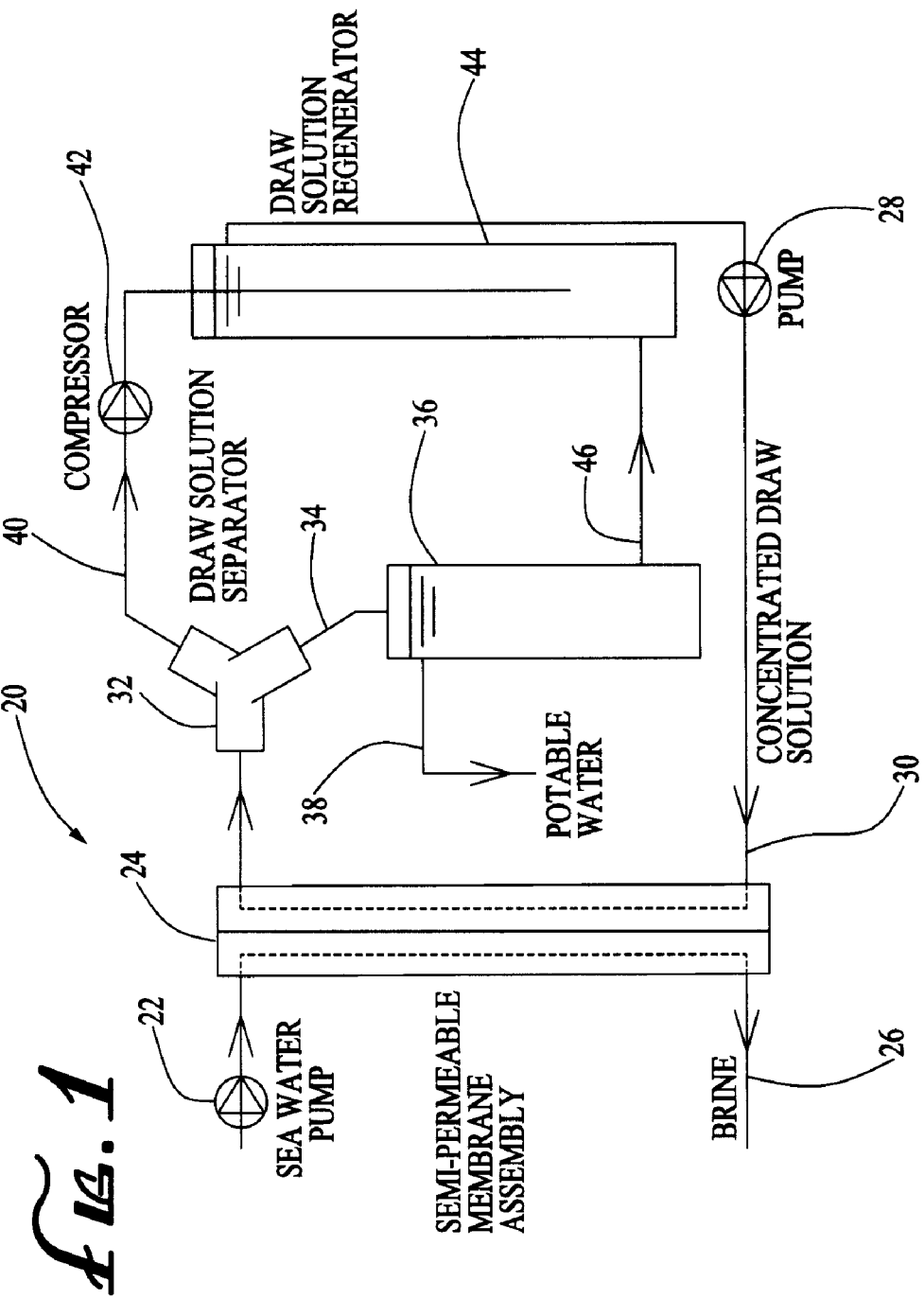
FIG. 1 is a simplified block diagram of a forward osmosis water purification process and system which constitutes the present invention.

Referring to FIG. 1, FIG. 1 illustrates a simplified block diagram of a continuous forward osmosis (FO) water purification system, designated generally by the reference numeral 20, which uses a saturated solution of ammonium bicarbonate as the draw solution. A low pressure seawater pump 22 continuously pumps seawater through one side of a semi-permeable membrane unit/assembly 24 via a fluid flow path 26. A pump 28 pumps a concentrated draw solution through the opposite side semi-permeable membrane assembly 24 via a fluid flow path 30. The high osmotic pressure of the draw solution pulls water molecules from the seawater through the membrane assembly 24 and into the draw solution.

The draw solution exits the membrane assembly 24 at a lower osmotic pressure because it has been diluted with water molecules.

The draw solution is transferred from the membrane assembly 24 to a draw solution separator 32. The draw solution separator 32 receives the draw solution which is heated to a temperature greater than 150° F. Above 150° F., the ammonium bicarbonate decomposes into ammonia, carbon dioxide and water. Separator 32 then separates these products of decomposition into separate ammonia, carbon dioxide and water factions. Water exits the draw solution separator 32 via fluid flow path 34 to a potable water separator 36. The ammonia and carbon dioxide exits via a gas flow path 40 to a compressor 42 which compresses the ammonia and carbon dioxide gases prior to supplying the compressed gases to a draw solution regenerator 44.

Excess potable water exits separator 36 via a fluid flow path 38, while the remaining water potable flows to the draw solution regenerator 44 via a fluid flow path 46. The draw solution regenerator 44 recombines this water with the ammonia and carbon dioxide gases to produce the concentrated draw solution. Pump 28 again pumps the draw solution through membrane assembly 24 to collect water droplets from the seawater being pumped through the membrane assembly 24.

Referring to FIG. 2, there is shown a preferred embodiment of the forward osmosis water purification system 60 for extracting potable water from seawater. Water production is maximized when fresh seawater and a concentrated draw solution are on opposites sides of a membrane 62 located within a membrane assembly 63 as shown FIG. 2.

A low pressure seawater pump 64 continuously pumps seawater past one side of the membrane 62 within membrane assembly 63 via a fluid flow path 65. The membrane 63 may be made from any of several commercially available membrane materials and might be configured as a bundle of hollow fibers. The seawater flows external to the fibers and draws solution internally to the fibers. Another pump 68 pumps concentrated draw solution passed the opposite side of membrane 62 via a fluid flow path 70 from a draw solution regenerator 76 which is connected to membrane assembly 63 through pump 68. The high osmotic pressure of the draw solution passing through the membrane assembly 63 pulls water molecules from the seawater passing through membrane assembly 63 into the draw solution.

When ammonium bicarbonate is used as the draw solution in forward osmosis water purification system 60, a 3 molar solution of ammonium bicarbonate produces an osmotic pressure of 100 atm (atmospheres). A 3 molar concentration of ammonium bicarbonate is about 240 grams of ammonium bicarbonate per liter of water. This is effectively a saturated solution of ammonium bicarbonate. The osmotic pressure in the draw solution, which is approximately 100 atm is significantly than the osmotic pressure of seawater which is 26 atm. It should be noted that the draw solution exits the membrane assembly 63 at a lower osmotic pressure since the draw solution is diluted with water molecules.

The draw solution, which is diluted, exits the membrane assembly 63 and is transferred to heater 66. Heater 66 is positioned downstream from membrane assembly 63 along fluid flow path 61.

Heater 66 heats the draw solution to a temperature above the decomposition temperature of ammonium bicarbonate, which is about 150° F. The ammonium bicarbonate decomposes into ammonia gas, carbon dioxide gas, and water as shown by the following chemical formula:

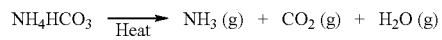

$$NH_4HCO_3 \xrightarrow{Heat} NH_3(g) + CO_2(g) + H_2O(g)$$

About 85% of the ammonia and over 99% of the carbon dioxide rise to the top of heater 66 as gases. The ammonia and carbon dioxide gases are transferred to and collected by a compressor 72 which us positioned downstream from heater 66 along gas flow path 74. The compressor 72 compresses and transfers the ammonia and carbon dioxide gases to draw solution regenerator 76.

The solubility of carbon dioxide in water is low and decreases further as the temperature is increased. At 150° F., the solubility is only 0.01 moles per liter which is about 0.5 grams/liter. Carbon dioxide is easily expelled from the heater 66 to compressor 72.

A significant portion (about 15%) of the ammonia gas remains dissolved in water. Ammonia is a polar compound and consequently is highly soluble in water.

The water vapor formed by the decomposition of ammonium carbonate within heater 66 condenses into liquid water.

The diluted draw solution including the ammonia gas dissolved in water, enters a draw solution separator, which may take the form of a air stripping/packed column 78 via a fluid flow path 80. As the diluted draw solution flows in a downward direction through the packing media 82 within column 78, a counter flow of air, carbon dioxide or other gas in upward direction in column 78 strips a significant portion of the ammonia gas from the water flowing down the column. The ammonia gas stripped by column 78 is provided to compressor 72 which then compresses the ammonia gas and the stripping gas.

A liquid gas separation membrane system may also be used in lieu of the stripping column to selectively separate the remaining ammonia gas in the solution from the water product.

A pump 84 transfers desalinated water collected at the bottom of air stripping/packed column 78 to a heat exchanger 86 via a fluid flow path 87. The heat exchanger 86 facilitates heat transfer from the desalinated water to the seawater brine discharge from membrane assembly 63. This cools the desalinated water which is next supplied to a separator 88. The seawater brine discharge flows from membrane assembly 63 via fluid flow path 89 to heat exchanger 86 and upon exiting heat exchanger 86 is drained from system 60 as shown in FIG. 2.

Separator 88 removes the desalinated water extracted by the forward osmosis process, leaving a sufficient amount of water in the forward osmosis water purification system 60 for system 60 to continue extracting potable water from seawater.

A zeolite polisher 90 may also be provided to remove any residual ammonia and enhance potable water. The polisher 90 uses an absorbent to remove residual ammonia. A slight vacuum on the potable water stream is an effective method for reducing the concentration of residual ammonia.

The ammonia and carbon dioxide gases are collected at the top of the stripping column 78 and then forced through the draw solution regenerator 76 by compressor 72.

Ammonia gas, carbon dioxide and water are recaptured back into a strong solution of ammonium bicarbonate in the regenerator 76. Ammonium bicarbonate is formed in a serial gas-liquid chemical reaction which is set forth as follows:

$$NH_3+CO_2 \rightarrow NH_2COONH_4$$

The $NH_2COONH_4$ is hydrolyzed to form:

$$NH_2COONH_4+H_2O \rightarrow NH_4HCO_3+NH_3$$

The ammonia reacts with water to form $NH_4OH$ $$NH_3+H_2O \rightarrow NH_4OH$$

The $NH_4HCO_3$ reacts with the $NH_4OH$ to form $(NH3)_2CO_3$ $$NH_4HCO_3+NH_4OH \rightarrow (NH3)_2CO_3+H_2O$$

The $(NH3)_2CO_3$ then absorbs $CO_2$ to form ammonium bicarbonate.

$$(NH3)_2CO_3+CO_2+H_2O \rightarrow NH_4HCO_3$$

What is claimed is:

1. An apparatus for withdrawing potable water from seawater using forward osmosis comprising:
    (a) a semi-permeable membrane assembly which allows passage of water molecules from seawater and other sources of non-potable water to a concentrated salt solution, wherein said concentrated salt solution is a draw solution;
    (b) a first pump connected to said membrane assembly, said first pump pumping said seawater through said membrane assembly wherein said seawater passes through said membrane assembly on one side of said membrane assembly;
    (c) a second pump connected to said membrane assembly, said second pump pumping a concentrated draw solution consisting of a solution of ammonium bicarbonate in water through said membrane assembly on an opposite side of said membrane assembly wherein said concentrated draw solution passes through said membrane assembly at a high osmotic pressure resulting in said concentrated draw solution pulling water molecules from said seawater through said membrane into said concentrated draw solution which results in a diluted draw solution exiting said membrane assembly;
    (d) a heater connected to said membrane assembly to receive said diluted draw solution from said membrane assembly, said heater heating said diluted draw solution to a temperature above a decomposition temperature for said solution of ammonium bicarbonate in water, said diluted draw solution decomposing into ammonia gas, carbon dioxide and water;
    (e) a draw solution separator comprising a stripping column connected to said heater to receive said water having ammonia gas dissolved therein, wherein said stripping column includes a counter flow of a gas moving in upward direction through a packing media within said stripping column which strips a significant portion of the ammonia gas from the water flowing downward through the packing media within said stripping column, wherein said gas is selected from the group comprising air, nitrogen gas and carbon dioxide gas;
    (f) a compressor connected to said heater and said stripping column to receive and then compress said ammonia gas and said carbon dioxide;
    (g) a potable water separator connected to said stripping column to receive the water from said stripping column, said potable water separator separating excess water from the water within said potable water separator wherein the excess water consist of the water molecules pulled from said seawater, said excess water when removed from said potable water separator consisting of said potable water;
    (h) a draw solution regenerator connected to said compressor to receive said ammonia gas and said carbon dioxide, said draw solution regenerator being connected to said potable water separator to receive the water remaining in said potable water separator after said potable water is separated therefrom, said draw solution regenerator combining the water received from said potable water separator with said ammonia gas and said carbon dioxide from said compressor to regenerate said concentrated draw solution; and
    (i) said second pump being connected to said draw solution regenerator to withdraw said concentrated draw solution from said draw and then pump said concentrated draw solution to said membrane assembly.

2. The apparatus of claim 1 further comprising a third pump for transferring the water from said stripping column to said potable water separator, wherein the water transferred to said potable water separator has said ammonia gas stripped therefrom by said air stripping column.

3. The apparatus of claim 1 further comprising a heat exchanger which transfers heat from the water exiting said stripping column to the seawater exiting said membrane assembly.

4. The apparatus of claim 1 wherein said membrane assembly comprises a membrane consisting of a bundle of hollow fibers.

5. The apparatus of claim 1 wherein the high osmotic pressure of said solution of ammonium bicarbonate in water is approximately 100 atm which is substantially above a pressure for seawater of 26.4 atm.

6. The apparatus of claim 1 wherein said draw solution regenerator forms ammonium bicarbonate (NH4HCO3) from ammonia gas, carbon dioxide gas and water as follows:

$$NH3+CO2 \rightarrow NH2COONH4$$

wherein the NH2COONH4 is hydrolyzed to form:

$$NH2COONH4+H2O \rightarrow NH4HCO3+NH3$$

wherein the ammonia reacts with water to form NH4OH:

$$NH3+H2O \text{ - - - } +NH4OH$$

wherein the NH4HCO3 reacts with the NH4OH to form (NH3) 2CO3:

$$NH4HCO3+NH4OH \rightarrow (NH3)2CO3+H2O$$

and, the (NH3)2CO3 then absorbs CO2 to form the ammonium bicarbonate:

$$(NH3)2CO3+CO2+H2O \text{ - - - } +2NH4HCO3.$$

7. The apparatus of claim 1 further comprising a zeolite polisher connected to said potable water separator to receive said potable water and remove residual ammonia from said potable water.

* * * * *